Patented Mar. 10, 1936

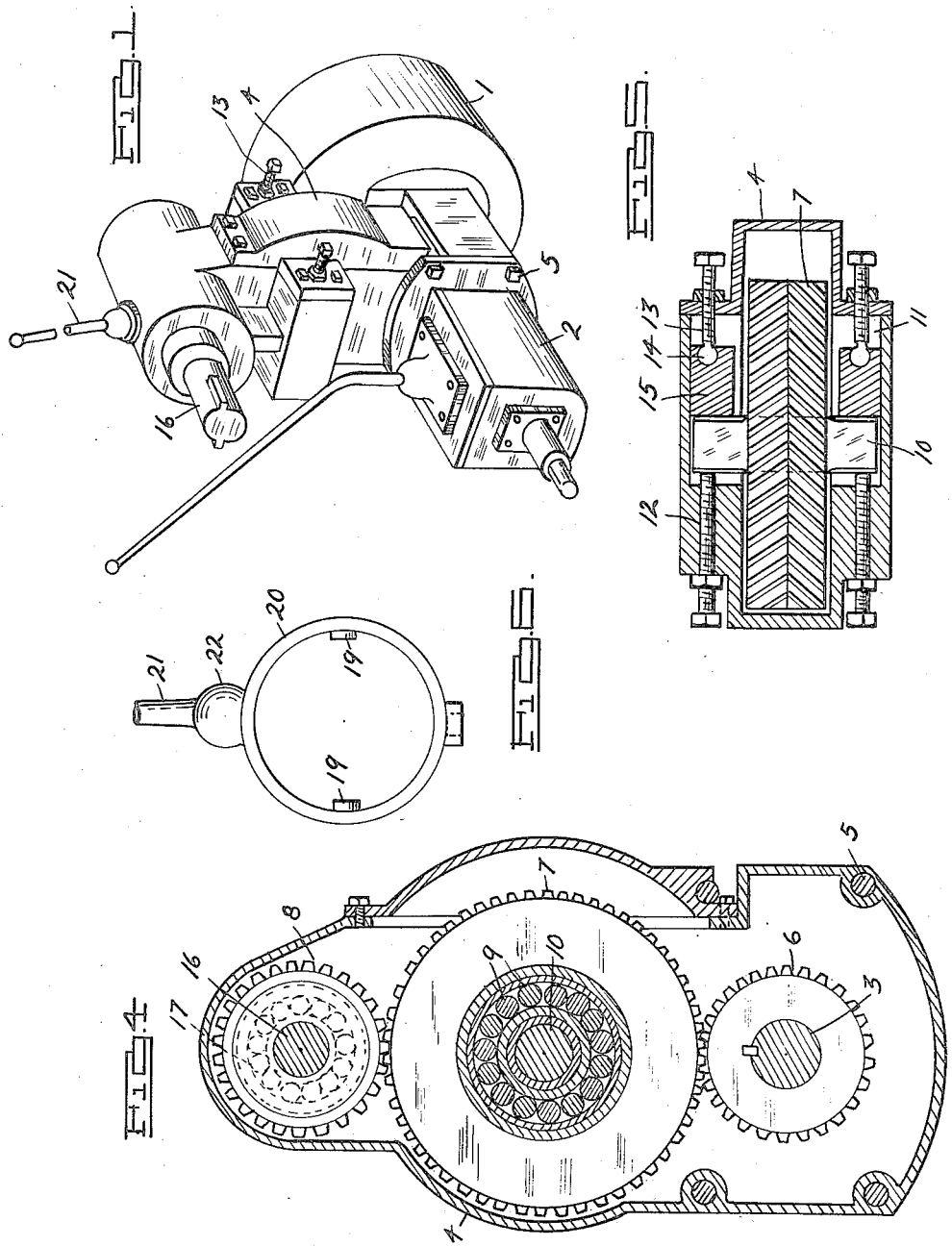

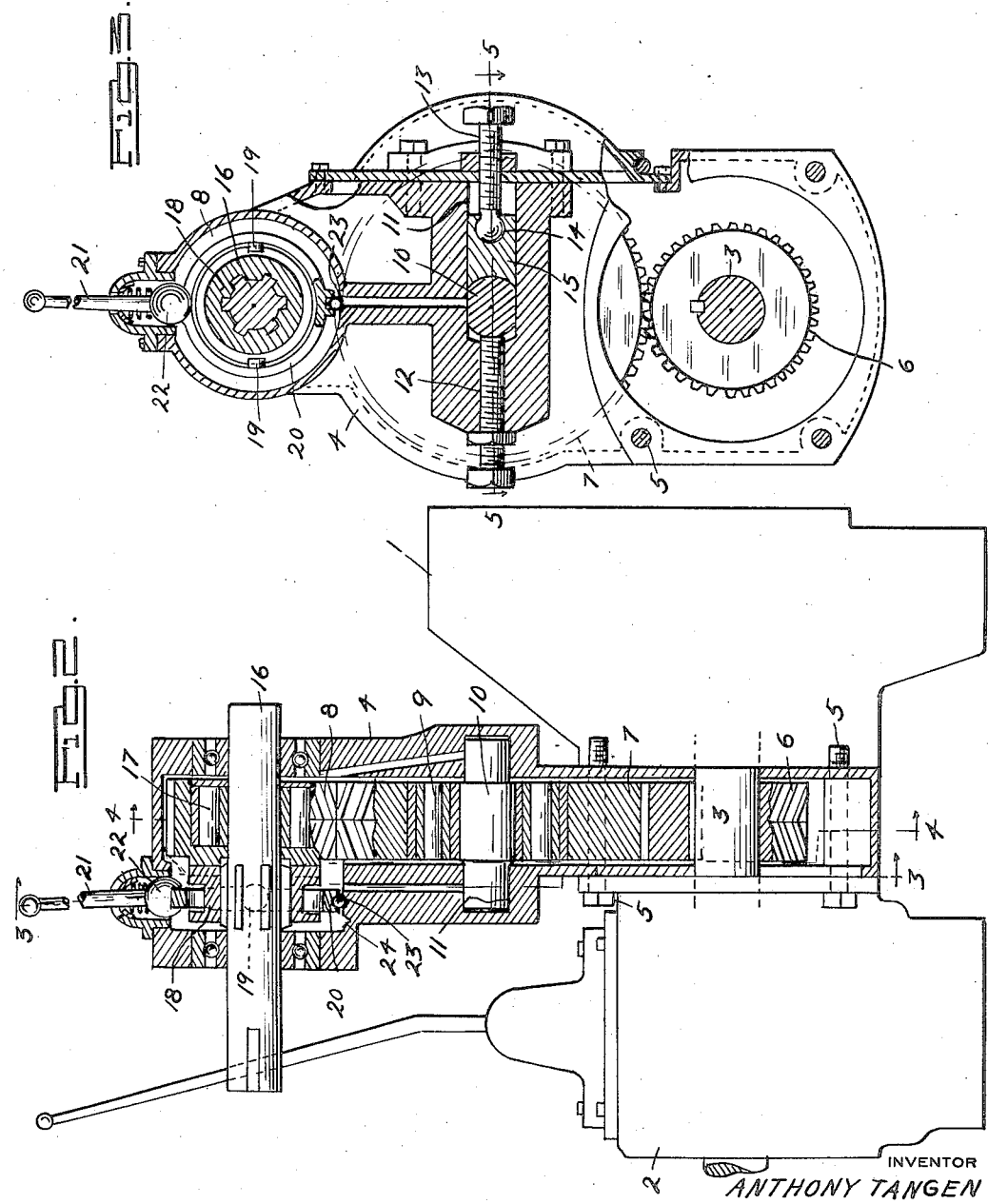

2,033,597

UNITED STATES PATENT OFFICE 2,033,597

POWER TAKE-OFF MECHANISM

Anthony Tangen, Detroit, Mich.

Application April 10, 1935, Serial No. 15,525

2 Claims. (Cl. 74—11)

This invention relates to power take-off mechanisms such as adapt a power plant of a motor vehicle to serve various purposes other than vehicle propulsion.

An object of the invention is to provide by a simple installation for establishing a drive to any desired machinery from a point between the clutch and transmission of a motor vehicle.

Another object is to provide an encased gearing adapted to be installed between the clutch and transmission casings of a motor vehicle, and to transmit power to a shaft located above the clutch axis conveniently for driving any desired machinery.

A further object is to control the drive to the power take-off shaft by a clutch installed in the power take-off casing.

A further object is to provide a simple adjustment for one of the power take-off gears to eliminate back lash, unnecessary noise, and undue wear of said gears.

These and various other objects the invention attains by the construction hereinafter described, and illustrated in the accompanying drawings, wherein:

Fig. 1 is a perspective view of the clutch and transmission casings of a motor vehicle, showing the installation therebetween of a power take-off unit.

Fig. 2 is a longitudinal elevational view of the same, showing the take-off unit in vertical axial section.

Fig. 3 is a vertical sectional view of the power take-off unit, taken on the line 3—3 of Fig. 2.

Fig. 4 is another vertical cross sectional view of said unit, taken on the line 4—4 of Fig. 2.

Fig. 5 is a horizontal cross section of the unit, taken on the line 5—5 of Fig. 3.

Fig. 6 is an elevational view of a lever for actuating a clutch, controlling the drive to the power take-off shaft.

In these views, the reference characters 1 and 2 designate respectively the usual clutch and transmission casings of a motor vehicle.

In installing my power take-off unit, the casings 1 and 2 which ordinarily are bolted directly to one another, are spaced apart a few inches, and a replacement shaft 3 of the necessary additional length is substituted for the original shaft driving the transmission gearing (not shown) from the clutch (not shown). Snugly fitted between the casings 1 and 2 is a casing 4 upwardly projecting from the clutch axis and bolted to the casings 1 and 2, as indicated at 5. The bolts 5 may be received by the same openings of the casings 1 and 2 that originally received bolts directly connecting said casings. Housed within the casing 4 is a train of gears 6, 7, and 8, disposed one above another, the lowermost gear 6 being keyed on the shaft 3. The intermediate gear 7 is journaled by rollers 9 or the like on a nonrotative shaft 10. The ends of the shaft 10 are preferably planed off at top and bottom, to fit into slideways 11 transversely and interiorly formed in opposite walls of the casing 4. Said shaft and the intermediate gear are adjustable lengthwise of the slideways 11 by means of paired screws 12 and 13, each end of the shaft being acted upon by one such pair (Fig. 5). The screws 12 directly engage the shaft ends while the screws 13 have ball heads 14 engaging bearing blocks 15 slidable in the ways 11 and seating against the shaft. By suitably adjusting these screws, the gear 7 may be positioned to eliminate any lost motion or back lash, thus avoiding unnecessary noise and undue wear of the gears.

The uppermost gear 8 is freely mounted on a shaft 16 parallel to the shaft 3 preferably through rollers 17 or other anti-friction means. Splined on the shaft 16 at one side of the gear 8 and within the casing 4 is a clutch collar 18, said collar and the gear 8 having coacting clutch faces, one of which is shown in Fig. 4. The collar 18 is formed with the usual peripheral groove for receiving a pair of studs 19 carried by an annular portion 20 of a shift lever 21, said lever having a ball-shaped member 22 fulcruming the lever in the casing 4 above the collar 18. Below said collar, the annulus 20 carries a ball detent 23, which is engageable alternatively in sockets 23 of the casing to maintain the driving or nondriving position of the clutch collar. The shaft 16 projects rearwardly of the casing 4 sufficiently for its engagement by any desired power transmission element (not shown).

The described power take-off may be utilized to drive electric welding outfits, air compressors or blowers, pumps, refrigerating mechanisms, saws, grinders, hoists or any other desired mechanism. The gear ratio may be selected to drive the take-off shaft 16 at any desired speed, and the location of said shaft above the transmission casing is convenient for a drive connection to any desired machinery.

Control of the drive to the power take-off shaft by a clutch forming a unit installation with said shaft and its drive gearing simplifies installation of the power take-off and minimizes the cost thereof.

It will be noted that the lever 21 is adapted to rise through the floor of a vehicle in convenient proximity to the driver's seat, while out of the way of the driver. The mechanism is one that will deliver power at a high and continuous speed rate over a long period of time without material deterioration.

The invention is presented as including all such modifications and changes as come within the scope of the following claims.

What I claim is:

1. In a power take-off, the combination with the clutch and transmission casings of a motor vehicle, and a shaft driving the transmission from the clutch, of a third casing snugly fitted between the two first-mentioned casings, a power take-off shaft journaled in the third casing means within the third casing for driving the power take-off shaft from the first-mentioned shaft, and a plurality of elements detachably connecting the three casings and clamping the third casing between the other two.

2. A power take-off, as set forth in claim 1, the third casing projecting above the clutch and transmission casings, and having its upper portion enlarged to extend above the transmission casing, and a clutch in such enlarged portion controlling said drive means.

ANTHONY TANGEN.